(No Model.)

W. R. HAVENS & S. E. REAUGH.
PROCESS OF MANUFACTURING ARTIFICIAL STONE.

No. 404,040. Patented May 28, 1889.

WITNESSES,
S. Walter Fowler,
W. H. Patterson

INVENTORS
William R. Havens,
Samuel E. Reaugh,
by A. H. Evans & Co
Attorneys

UNITED STATES PATENT OFFICE.

WILLIAM R. HAVENS AND SAMUEL E. REAUGH, OF DENVER, COLORADO.

PROCESS OF MANUFACTURING ARTIFICIAL STONE.

SPECIFICATION forming part of Letters Patent No. 404,040, dated May 28, 1889.

Application filed October 24, 1888. Serial No. 289,029. (No model.)

*To all whom it may concern:*

Be it known that we, WILLIAM R. HAVENS and SAMUEL E. REAUGH, citizens of the United States, residing at Denver, in the county of Arapahoe and State of Colorado, have invented certain new and useful Improvements in the Process of Manufacturing Artificial Stone, of which the following is a full and clear description, reference being had to the accompanying drawings, forming part of this specification, in which—

Figure 1:
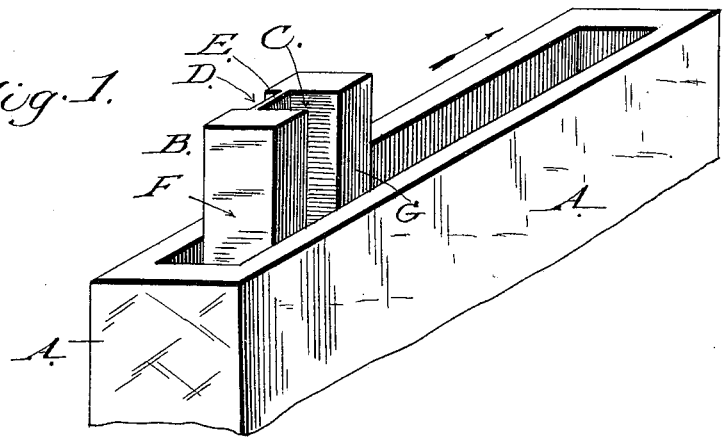
Figure 2:
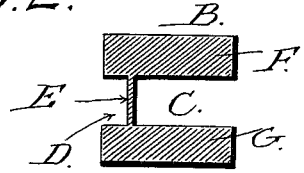

Figure 1 represents one form of apparatus for carrying out our process. Fig. 2 is a cross-sectional view of a rammer for receiving and compressing the material.

Our invention relates to the manufacture of artificial stone for pavement or building purposes; and the same consists, essentially, in the process which we shall hereinafter fully describe and claim.

To enable others skilled in the art to make and use our invention, we will now describe its construction and indicate a manner for carrying the same out.

In manufacturing our stone we employ two different kinds of material—one a rather coarse gravel or broken slag mixed with cement, forming the body or principal mass of the stone, the other material a fine sand or ground slag mixed with a greater ratio of cement, forming a smooth face. This same structure is already used in laying monolithic sidewalk-pavements, (except, perhaps, the broken and ground slag,) and may also be used in making paving-blocks in a mold; but our manner of uniting the two materials (body and face) is different in many respects from other processes, in many of which the body of the stone (coarse material) is rammed or pressed together, and then the face (fine material) is rammed, pressed, or laid on, or vice versa, the face first and then the body; but we in our process build the stone up on its edge or end, face, body, and all at the same time, in the following manner, viz:

In a mold, A A, of suitable size, made of iron or any material of sufficient strength, we place a number of rammers, B, which are constructed similar to that shown in Fig. 2. There are a sufficient number of these rammers, although in Fig. 1 we illustrate but a single one, to almost fill the mold along its length when placed side by side, touching each other. Each rammer has a width about equal to the width of the mold, whereby it about fills the mold crosswise or between faces. These rammers are rapidly raised and let fall by any lifting mechanism, and the machinery that raises the rammer or rammers also operates certain feeding-machines, (not herein shown,) one set of which is designed to drop into the space C in the rammer some coarse material, and another set discharges at the same time into the space D in said rammer some fine material. The combined materials are dropped into the mold at such time as is necessary to insure their falling onto the edge or end of the progressing stone in the mold while the rammer is for an instant resting there, the partition E, which separates the spaces C and D, keeping them apart. When the rammers again rise, the materials are left lying there separately, the coarse material on one side of the mold and the fine material on the other, and while the rammer is elevated the mold containing the stone is caused to move by any suitable mechanism in the direction of the arrow a distance about equal to the space C or D, and when the rammer falls the parts F and G strike the materials previously deposited in the mold, as above described, and while down the feeding mechanism again discharges the materials into the spaces C and D, but in a different place on the stone from that in which the previous discharge was deposited. Then the rammer rises and the mold moves back again, &c. The amounts dropped by the feeding mechanisms each time is just sufficient for one blow of the rammer to properly compact or drive to place—a principal somewhat analogous to that used in weaving cloth, a thread being put in place by a shuttle and then driven up close. In its effect it differs from what we suppose to be the usual methods, in that it does not strike the same materials a number of times, thereby pounding them to pieces or driving the cement away from them, and in there being but a small quantity added each time, thus obtaining the fullest effect of the blow. It will be readily seen that the maximum effect of the blow could not be obtained by the usual methods of placing a larger quantity of materials under the rammer and then striking it a number of times, because the lower part of such larger quantity would be but little affected by the first blow, somewhat more affected by the next, and so on, and would require more blows to thoroughly compact the material than if a little of it were struck, then a little more, &c. We are therefore enabled to obtain a thoroughly-rammed stone with the face and body joined by a ragged uneven line and in such a manner that they will not part, and also obtain a great advantage in ramming the face and that portion of the body directly opposite it at the same time, so that they will set together and evenly.

Having thus described our invention, what we claim as new, and desire to secure by Letters Patent, is—

1. The process herein described of manufacturing artificial stone, consisting, essentially, in tamping on edge or end charges of coarse and fine material, the coarse material being on one side and the fine material being on the other side, substantially as herein described.

2. The process herein described of manufacturing artificial stone, consisting, essentially, in discharging into a suitable mold charges of coarse and fine material, so that the coarse material occupies one side of the mold and the fine material the opposite side, tamping said materials on edge or end, so that they may be caused to unite, advancing the mold longitudinally, then adding fresh charges, and finally tamping said charges, substantially as herein described.

WILLIAM R. HAVENS.
SAMUEL E. REAUGH.

Witnesses:
B. S. HOPKINS,
H. T. SIMPSON.